US006480782B2

(12) United States Patent
Brackney et al.

(10) Patent No.: US 6,480,782 B2
(45) Date of Patent: Nov. 12, 2002

(54) SYSTEM FOR MANAGING CHARGE FLOW AND EGR FRACTION IN AN INTERNAL COMBUSTION ENGINE

(75) Inventors: Larry J. Brackney; Thomas A. Dollmeyer, both of Columbus, IN (US); George Brunemann, Cincinnati, OH (US)

(73) Assignee: Cummins, Inc., Columbus, IN (US)

( * ) Notice: Subject to any disclaimer, the term of this patent is extended or adjusted under 35 U.S.C. 154(b) by 50 days.

(21) Appl. No.: 09/773,151

(22) Filed: Jan. 31, 2001

(65) Prior Publication Data

US 2002/0103593 A1 Aug. 1, 2002

(51) Int. Cl.$^7$ .................. F02M 25/07; F02D 23/00; F02B 37/12
(52) U.S. Cl. .............. 701/108; 123/568.21; 60/600; 60/602; 60/605.2
(58) Field of Search ................ 123/568.11, 568.16, 123/568.21; 701/108; 60/602, 605.2, 606, 607, 608, 601, 600

(56) References Cited

U.S. PATENT DOCUMENTS 4,445,488 A 5/1984 Tanaka et al.
4,942,860 A 7/1990 Chujo et al.

(List continued on next page.)

FOREIGN PATENT DOCUMENTS

| EP | 0 984 153 A2 | 3/2000 |
|----|---|---|
| JP | 06336957 | 12/1994 |
| JP | 11324817 | 11/1999 |

*Primary Examiner*—Willis R. Wolfe (57) ABSTRACT

A charge limit manager arbitrates between desired EGR system and/or turbocharger behavior and the actual capabilities of EGR system and/or turbocharger control mechanisms under current operating conditions. In one embodiment, the charge limit manager includes three limiter blocks producing offset signals as separate functions of turbocharger compressor outlet temperature, turbocharger speed and pressure differential ($\Delta P$) across an EGR valve. A charge limit selector block is responsive to the offset values produced thereby, and also to commanded values of charge flow and EGR fraction as well as operating values of EGR valve position and $\Delta P$, to limit the charge flow and EGR fraction commands to controllable values. These values are preferably subtracted from actual or estimated values of charge flow and EGR fraction to produce charge flow and EGR fraction error values for use in controlling one or more EGR system and/or turbocharger swallowing capacity/efficiency control mechanisms.

25 Claims, 8 Drawing Sheets

U.S. PATENT DOCUMENTS

| | | |
|---|---|---|
| 4,969,104 A | 11/1990 | Suzuki et al. |
| 5,063,510 A | 11/1991 | Jurgens et al. |
| 5,086,745 A | 2/1992 | Nishimura et al. |
| 5,150,696 A | 9/1992 | Kabasin et al. |
| 5,203,311 A | 4/1993 | Hitomi et al. |
| 5,205,265 A | 4/1993 | Kashiyama et al. |
| 5,273,019 A | 12/1993 | Matthews et al. |
| 5,301,126 A | 4/1994 | Nishimura et al. |
| 5,303,168 A | 4/1994 | Cullen et al. |
| 5,440,880 A | 8/1995 | Ceynow et al. |
| 5,503,129 A | 4/1996 | Robichaux et al. |
| 5,509,394 A | 4/1996 | Hitomi et al. |
| 5,524,591 A | 6/1996 | Hirota et al. |
| 5,558,070 A | 9/1996 | Bell et al. |
| 5,617,726 A | 4/1997 | Sheridan et al. |
| 5,666,931 A | 9/1997 | Pierik et al. |
| 5,682,684 A | 11/1997 | Wentzlaff et al. |
| 5,690,083 A | 11/1997 | Gopp et al. |
| 5,724,950 A | 3/1998 | Shino et al. |
| 5,738,126 A | 4/1998 | Fasten |
| 5,755,101 A | 5/1998 | Free et al. |
| 5,771,867 A | 6/1998 | Amstutz et al. |
| 5,771,868 A | 6/1998 | Khair |
| 5,778,674 A | 7/1998 | Kimura |
| 5,785,030 A | 7/1998 | Paas |
| 5,791,319 A | 8/1998 | Friedrich et al. |
| 5,797,370 A | 8/1998 | Kimura et al. |
| 5,832,896 A | 11/1998 | Phipps |
| 5,845,627 A | 12/1998 | Olin et al. |
| 5,889,203 A | 3/1999 | Wild et al. |
| 5,921,223 A | 7/1999 | Fukuma |
| 5,921,224 A | 7/1999 | Sinnamon |
| 5,927,075 A | 7/1999 | Khair |
| 5,934,249 A | 8/1999 | Nanba et al. |
| 5,964,820 A | 10/1999 | Miwa et al. |
| 6,009,862 A * | 1/2000 | Wanat et al. .......... 123/568.21 |
| 6,032,656 A * | 3/2000 | Itoyama et al. ........ 123/568.21 |
| 6,035,640 A * | 3/2000 | Kolmanovsky et al. .... 60/605.2 |
| 6,067,800 A * | 5/2000 | Kolmanovsky et al. ....... 60/602 |
| 6,230,697 B1 * | 5/2001 | Itoyama et al. ........ 123/568.21 |
| 6,338,250 B1 * | 1/2002 | Mackay ...................... 60/602 |
| 6,360,541 B2 * | 3/2002 | Waszkiewicz et al. ..... 60/605.2 |

\* cited by examiner

SYSTEM FOR MANAGING CHARGE FLOW AND EGR FRACTION IN AN INTERNAL COMBUSTION ENGINE

FIELD OF THE INVENTION

The present invention relates generally to systems for managing charge flow and EGR fraction in an EGR control system for an internal combustion engine, and more specifically to such systems for controllably arbitrating between commanded values of charge flow and EGR fraction and the physical capabilities of corresponding EGR and/or turbocharger control mechanisms.

BACKGROUND OF THE INVENTION

Figure 1:
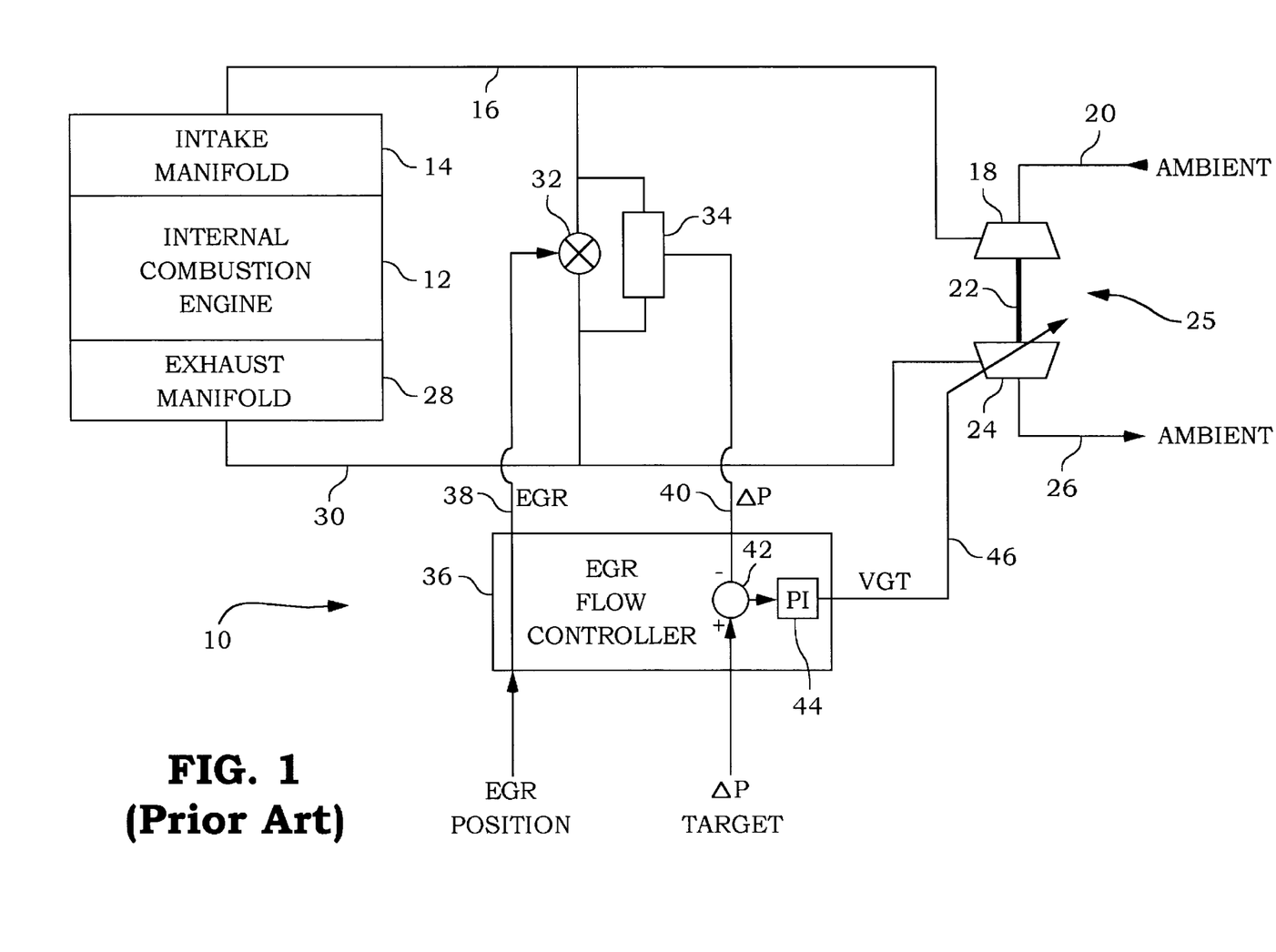
FIG. 1 is a diagrammatic illustration of one known EGR system and turbocharger swallowing capacity control system for an internal combustion engine.

Systems for controlling EGR flow and/or turbocharger swallowing capacity are known and have been widely implemented, particularly in the heavy diesel engine industry. An example of one known system 10 for providing such control is shown in FIG. 1 and includes an internal combustion engine 12 having an intake manifold 14 fluidly coupled to a compressor 18 of a turbocharger 25 via intake conduit 16, wherein the compressor 18 receives fresh air via intake conduit 20. The turbocharger compressor 18 is mechanically coupled to a turbocharger turbine 24 via drive shaft 22, wherein turbine 24 is fluidly coupled to an exhaust manifold 28 of engine 12 via exhaust conduit 30, and is further fluidly coupled to ambient via exhaust conduit 26. An EGR valve 32 is disposed in fluid communication with the intake conduit 16 and the exhaust conduit 30, and a differential pressure sensor, or ΔP sensor, 34 is disposed across the EGR valve 32 to sense a pressure change, or delta pressure, across valve 32. An electronic EGR flow controller 36 has a first input receiving a signal indicative of desired EGR valve position, and has a first output electrically connected to EGR valve 32 via signal path 38. In the system shown in FIG. 1, the EGR flow controller is configured to apply the EGR position signal directly to the EGR valve 32. Controller 36 includes a second input receiving a signal indicative of a desired delta pressure value, or ΔP target, and a third input electrically connected to the ΔP sensor 34 via signal path 40 and receiving a signal thereat indicative of sensed delta pressure (ΔP). The ΔP value is subtracted from the ΔP target value within the EGR flow controller 36 and a ΔP error value produced thereby is applied to a proportional-integral (PI) or other known controller 44. An output of controller 44 produces a variable geometry turbocharger signal VGT that is used to control the swallowing capacity and/or efficiency of the turbocharger 25 via any of a number of known techniques via signal path 46. In operation, charge flow to the engine 12, defined for the purposes of the present invention as the sum of fresh air flow into intake conduit 16 and EGR flow into intake conduit 16, is controlled via control of the position of the EGR valve 32 and the pressure differential between the exhaust conduit 30 and intake conduit 16.

One drawback associated with an EGR flow control system 10 of the type illustrated in FIG. 1 is that there exists an interdependency between charge flow and EGR flow such that EGR flow and fresh air flow cannot be controlled separately. Once EGR flow is established by the EGR flow controller 36, the resulting charge flow is defined by whatever fresh air flow is available. System 10 may therefore be optimized for NOx control or for particulate control, but generally not for both. It is accordingly desirable to provide for an EGR control system wherein EGR flow and fresh air flow may be controlled separately to therefore gain better and more consistent control over the charge flow. Such a system for achieving this goal is described in co-pending U.S. patent application Ser. No. 09/773,654, entitled SYSTEM FOR DECOUPLING EGR FLOW AND TURBOCHARGER SWALLOWING CAPACITY/EFFICIENCY CONTROL MECHANISMS, which is assigned to the assignee of the present invention and the contents of which are incorporated herein by reference.

In such a system, however, it is further desirable to provide a control strategy that arbitrates between EGR/turbocharger control commands and the corresponding capabilities of the EGR and/or turbocharger control mechanisms. In conventional EGR/turbocharger control systems, EGR/turbocharger control commands are typically( based on open-loop control techniques, and therefore do not take into account current operating states of the various EGR system and/or turbocharger actuators. As a result, the desired EGR/turbocharger control commands may request one or more of the various EGR system and/or turbocharger actuators to respond in a manner that, due to its current operational state, it cannot satisfy or should not satisfy due to potential violation of a related operational constraint. What is therefore needed is a control strategy that limits EGR/turbocharger control commands based on current EGR system and/or turbocharger operating conditions and/or based on the capabilities of the EGR system and/or turbocharger control mechanisms.

SUMMARY OF THE INVENTION

The foregoing shortcomings of the prior art are addressed by the present invention. In accordance with one aspect of the present invention, a system for managing charge flow and EGR fraction in an internal combustion engine comprises a valve disposed between an exhaust manifold and an intake manifold of an internal combustion engine, means for determining a differential pressure across the valve resulting from flow of exhaust gas from the exhaust manifold to the intake manifold, a valve position sensor producing a position signal indicative of a position of the valve relative to a reference valve position, and a control circuit limiting a commanded EGR fraction value to a limited EGR fraction value as a function of the differential pressure signal and of the position signal.

In accordance with another aspect of the present invention, a system for managing charge flow and EGR fraction in an internal combustion engine comprises a turbocharger for an internal combustion engine including a compressor supplying fresh air to an intake manifold of the engine, means for determining an outlet temperature of the compressor, a limiter producing a penalty value as a function of the outlet temperature, and a control circuit limiting a commanded charge flow value to a limited charge flow value as a function of the penalty value.

In accordance with yet another aspect of the present invention, a system for managing charge flow and EGR fraction in an internal combustion engine comprises a turbocharger for an internal combustion engine including a compressor supplying fresh air to an intake manifold of the engine, a speed sensor producing a speed signal indicative of a rotational speed of the compressor, a limiter producing a penalty value as a function of the speed signal, and a control circuit limiting a commanded charge flow value to a limited charge flow value as a function of the penalty value.

In accordance with still another aspect of the present invention, a system for managing charge flow and EGR fraction in an internal combustion engine comprises a valve disposed between an exhaust manifold and an intake manifold of an internal combustion engine, means for determining a differential pressure across the valve resulting from flow of exhaust gas from the exhaust manifold to the intake manifold, a limiter producing a penalty value as a function of the differential pressure, and a control circuit limiting a commanded charge flow value to a limited charge flow value as a function of the penalty value.

In accordance with a further aspect of the present invention, a system for managing charge flow and EGR fraction in an internal combustion engine comprises a turbocharger for an internal combustion engine including a compressor supplying fresh air to an intake manifold of the engine, means for determining an outlet temperature of the compressor, a speed sensor producing a speed signal indicative of a rotational speed of the compressor, a first limiter producing a first penalty value as a function of the outlet temperature, a second limiter producing a second penalty value as a function of the speed signal, and a control circuit limiting a commanded charge flow value to a limited charge flow value as a function of at least one of the first and second penalty values. The system may further include a valve disposed between an exhaust manifold and the intake manifold of the engine, means for determining a differential pressure across the valve resulting from flow of exhaust gas from the exhaust manifold to the intake manifold, and a third limiter producing a third penalty value as a function of the differential pressure, and wherein the control circuit is operable to limit the commanded charge flow value to the limited charge flow value as a function of at least one of the first, second and third penalty values.

One object of the present invention is to arbitrate between desired EGR system and/or turbocharger behavior and the actual capabilities of EGR system and/or turbocharger control mechanisms under current operating conditions.

Another object of the present invention is to provide a system for managing EGR fraction in an internal combustion engine by limiting an EGR fraction command as a function of current engine operating conditions.

Yet another object of the present invention is to provide a system for managing charge flow in an internal combustion engine by limiting a charge flow command as a function of current engine operating conditions.

These and other objects of the present invention will become more apparent from the following description of the preferred embodiments.

DESCRIPTION OF THE PREFERRED EMBODIMENTS

For the purposes of promoting an understanding of the principles of the invention, reference will now be made to preferred embodiments illustrated in the drawings and specific language will be used to describe the same. It will nevertheless be understood that no limitation of the scope of the invention is thereby intended, such alterations and further modifications in the illustrated embodiments, and such further applications of the principles of the invention as illustrated therein being contemplated as would normally occur to one skilled in the art to which the invention relates.

Figure 2:
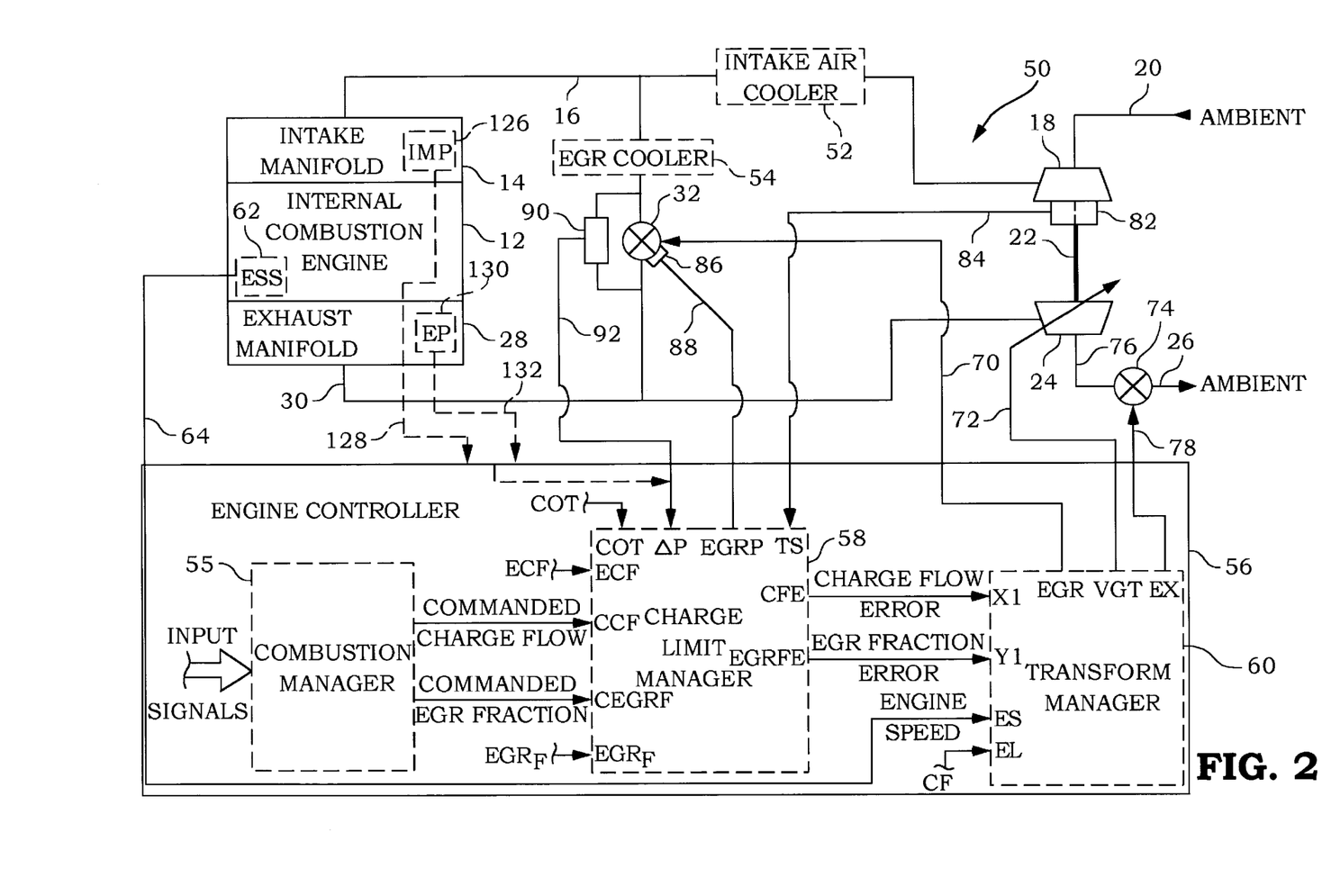
FIG. 2 is a diagrammatic illustration of one preferred embodiment of a system for managing charge flow and EGR fraction in an internal combustion engine, in accordance with the present invention.

Referring now to FIG. 2, one preferred embodiment of a system 50 for managing charge flow and EGR fraction in an internal combustion engine, in accordance with the present invention, is shown. System 50 includes several components in common with system 10 of FIG. 1, and like numbers are therefore used to identify like components. For example, system 50 includes an internal combustion engine 12 having an intake manifold 14 fluidly coupled to a compressor 18 of a turbocharger 25 via intake conduit 16, wherein the compressor 18 receives fresh air via intake conduit 20. Optionally, as shown in phantom in FIG. 2, system 50 may include an intake air cooler 52 of known construction disposed in line with intake conduit 16 between the turbocharger compressor 18 and the intake manifold 14. The turbocharger compressor 18 is mechanically coupled to a turbocharger turbine 24 via shaft 22, wherein turbine 24 is fluidly coupled to an exhaust manifold 28 of engine 12 via exhaust conduit 30, and is further fluidly coupled to ambient via exhaust conduit 26. An EGR valve 32 is disposed in fluid communication with the intake conduit 16 and the exhaust conduit 30, and an EGR cooler 54 of known construction may optionally be disposed between EGR valve 32 and intake conduit 16 as shown in phantom in FIG. 2.

System 50 includes an engine controller 56 that is preferably microprocessor-based and is generally operable to control and manage the overall operation of engine 12. Engine controller 56 includes a memory unit (not shown) as well as a number of inputs and outputs for interfacing with various sensors and systems coupled to engine 12. Controller 56, in one embodiment, may be a known control unit sometimes referred to as an electronic or engine control module (ECM), electronic or engine control unit (ECU) or the like, or may alternatively be a control circuit capable of operation as described hereinafter.

In any case, engine controller 56 preferably includes a combustion manager 55 receiving a number of input signals and producing commanded charge flow and commanded EGR fraction values. In accordance with the present invention, engine controller 56 further includes a charge limit manager 58 receiving the commanded charge flow and commanded EGR fraction values and producing a charge flow error value and an EGR fraction error value in a manner to be more fully described hereinafter. A transform manager 60 is included within the engine controller 56 and is responsive to the charge flow error and EGR fraction error values produced by the charge limit manager 58, as well as to an engine speed signal produced by an engine speed sensor 62 on signal path 64 and to a commanded fueling signal (CF), to produce a number of EGR system/turbocharger control signals EGR, VGT and EX for controlling EGR flow and/or turbocharger swallowing capacity and efficiency. For example, an EGR output of manager 60 is electrically connected to EGR valve 32, wherein EGR valve 32 is responsive to the EGR signal to establish a corresponding EGR valve position. A variable geometry turbocharger (VGT) output of manager 60 is electrically connected to a turbocharger actuating mechanism via signal path 72, wherein the turbocharger actuating mechanism may include an actuator for modulating the geometry of the turbocharger turbine 24 and/or a wastegate for controllably routing exhaust gas around turbine 24 between exhaust conduits 30 and 26. Finally, an exhaust throttle output (EX) of manager 60 is electrically connected to an exhaust valve 74 that is fluidly coupled to the turbocharger turbine 24 via conduit 76 and also to exhaust outlet conduit 26. Exhaust valve 74 is responsive to the EX signal to establish a corresponding exhaust valve position. It is to be understood that if the turbocharger actuating mechanism includes a wastegate, the output of the wastegate may be connected either upstream or downstream with respect to the exhaust throttle 74.

The transform manager 60 is used to control any one, or combination of, the charge flow control actuators including the EGR valve 32 (via the EGR output thereof, the exhaust throttle 74 (via the EX output thereof) and any of a number of variable geometry turbocharger actuators (via the VGT output thereof. Details relating to such control are provided in co-pending U.S. patent application Ser. No. 09/773,654, entitled SYSTEM FOR DECOUPLING EGR FLOW AND TURBOCHARGER SWALLOWING CAPACITY/EFFICIENCY CONTROL MECHANISMS, which is assigned to the assignee of the present invention, and the disclosure of which is incorporated herein by reference.

System 50 also includes a number of sensors and sensing systems for providing the engine controller 56 with information relating to the operation of engine 12, EGR valve 32. For example, the engine speed sensor 62 mentioned with respect to the description of the transform manager 60 is preferably of known construction and is operable to produce an engine speed signal indicative of engine rotational speed. In one embodiment, sensor 62 is a Hall effect sensor operable to determine engine speed by sensing passage thereby of a number of equi-angularly spaced teeth formed on a gear or tone wheel. In this embodiment, the gear or tone wheel further includes an extra tooth whereby sensor 62 is operable to determine current engine position relative to this extra tooth. Alternatively, engine speed sensor 62 may be any other known sensor operable as just described including, but not limited to, a variable reluctance sensor or the like.

System 50 further includes a turbocharger speed sensor 82 mechanically attached to the drive shaft 22 and/or the compressor 18 (as shown) or to the turbine 24 of the turbocharger 25, and electrically connected to the turbocharger speed (TS) input of the charge limit manager 58 via signal path 84. The turbocharger speed sensor 82 may be any known sensor operable to sense rotational speed, such as a variable reluctance or Hall effect sensor, and to provide a signal on signal path 84 indicative of rotational speed of shaft 22 relative to a fixed component such as compressor 18 or turbine 24.

The EGR valve 32 preferably includes an EGR position sensor 86 electrically connected to an EGR position input (EGRP) of the charge limit manager 58 via signal path 88. Sensor 86 is responsive to the position of the EGR valve 32 to produce a signal indicative of the position of the EGR valve 32 relative to a reference position. Sensor 86 is preferably a known position sensor, or may alternatively be another known mechanism producing a signal indicative of a degree or percentage of opening of the EGR valve 32 relative to a reference position, degree or percentage.

System 50 further includes a so-called ΔP sensor 90 preferably disposed across the EGR valve 32 and electrically connected to a ΔP input of the charge limit manager 58 via signal path 92. Sensor 90 has one end in fluid communication with intake conduit 16 and an opposite end in fluid communication with exhaust conduit 30, and is generally operable to provide a signal indicative of a pressure differential across the EGR valve 32. However, the present invention contemplates that the ΔP sensor 90 may be alternatively omitted from system 50 and replaced by an exhaust pressure sensor 130 in fluid communication with the exhaust manifold 28, as shown in phantom in FIG. 2, or in fluid communication with the exhaust conduit 30, and an intake manifold pressure sensor 126 disposed in fluid communication with intake manifold 14, as shown in phantom in FIG. 2, or in fluid communication with intake conduit 16 downstream of the EGR valve 32. In this embodiment, the engine controller 56 is operable to compute the pressure differential across EGR valve 32 by subtracting the exhaust pressure signal produced by sensor 130 on signal path 132 from the intake manifold pressure signal produced by sensor 126 on signal path 128. In any case, system 50 preferably includes one or more sensors operable to produce one or more corresponding sensor signals from which a pressure difference resulting from the flow of exhaust gas from exhaust gas structure 28,30 to intake structure 14,16 may be determined.

System 50 preferably includes a number of additional "virtual" sensors providing the charge limit manager 58 with information not directly obtainable via existing sensors. Such virtual sensors typically consist of software structures resident within the engine controller 56, and are responsive to various existing sensor and/or other system operational signals to estimate desired quantities for use by the charge limit manager. For example, the charge limit manager 58 includes a compressor outlet temperature input (COT) preferably receiving a compressor outlet temperature (COT) value from a COT virtual sensor. Generally, it is understood that operating temperatures associated with the fresh air outlet of compressor 18 (i.e., where intake conduit 16 meets the turbocharger compressor 18) may typically be quite high in an EGR engine, and that temperature sensors rugged enough to withstand this environment are not commercially available. Accordingly, the charge limit manager 58 preferably receives a compressor outlet temperature (COT) value from a COT estimation algorithm resident within engine controller 56. The COT estimation algorithm may be a known algorithm generally, and in one preferred embodiment a engine controller 56 includes a COT estimation algorithm of the type described in co-pending U.S. patent application Ser. No. 09/773,654 entitled SYSTEM FOR DETERMINING AND CONTROLLING TURBO- CHARGER COMPRESSOR OUTLET TEMPERATURE, which is assigned to the assignee of the present invention, and the disclosure of which is incorporated herein by reference. It is to be understood, however, that a physical temperature sensor may alternatively be located at the outlet of the turbocharger compressor 18 if and when such a sensor becomes commercially available, and that a compressor outlet temperature signal produced thereby may be provided to the COT input of the charge limit manager 58 in place of COT value provided by the COT virtual sensor.

The charge limit manager 58 also includes an EGR fraction input $EGR_F$ preferably receiving an estimated EGR fraction signal from an EGR fraction virtual sensor or EGR estimation algorithm resident within engine controller 56. The EGR fraction estimation algorithm may be a known algorithm generally, and in one preferred embodiment a engine controller 56 includes an EGR fraction estimation algorithm of the type described in co-pending U.S. patent application Ser. No. 09/774,897 entitled SYSTEM AND METHOD FOR ESTIMATING EGR MASS FLOW AND EGR FRACTION, which is assigned to the assignee of the present invention, and the disclosure of which is incorporated herein by reference. It is to be understood, however, that a mass air flow sensor may alternatively be disposed within the fluid passage connecting the exhaust conduit 30 to the intake conduit 16, wherein information provided by such a mass air flow sensor may be used to compute the EGR fraction value $EGR_F$ for use by the charge limit manager 58 in place of $EGR_F$ value provided by an $EGR_F$ virtual sensor.

Figure 3:
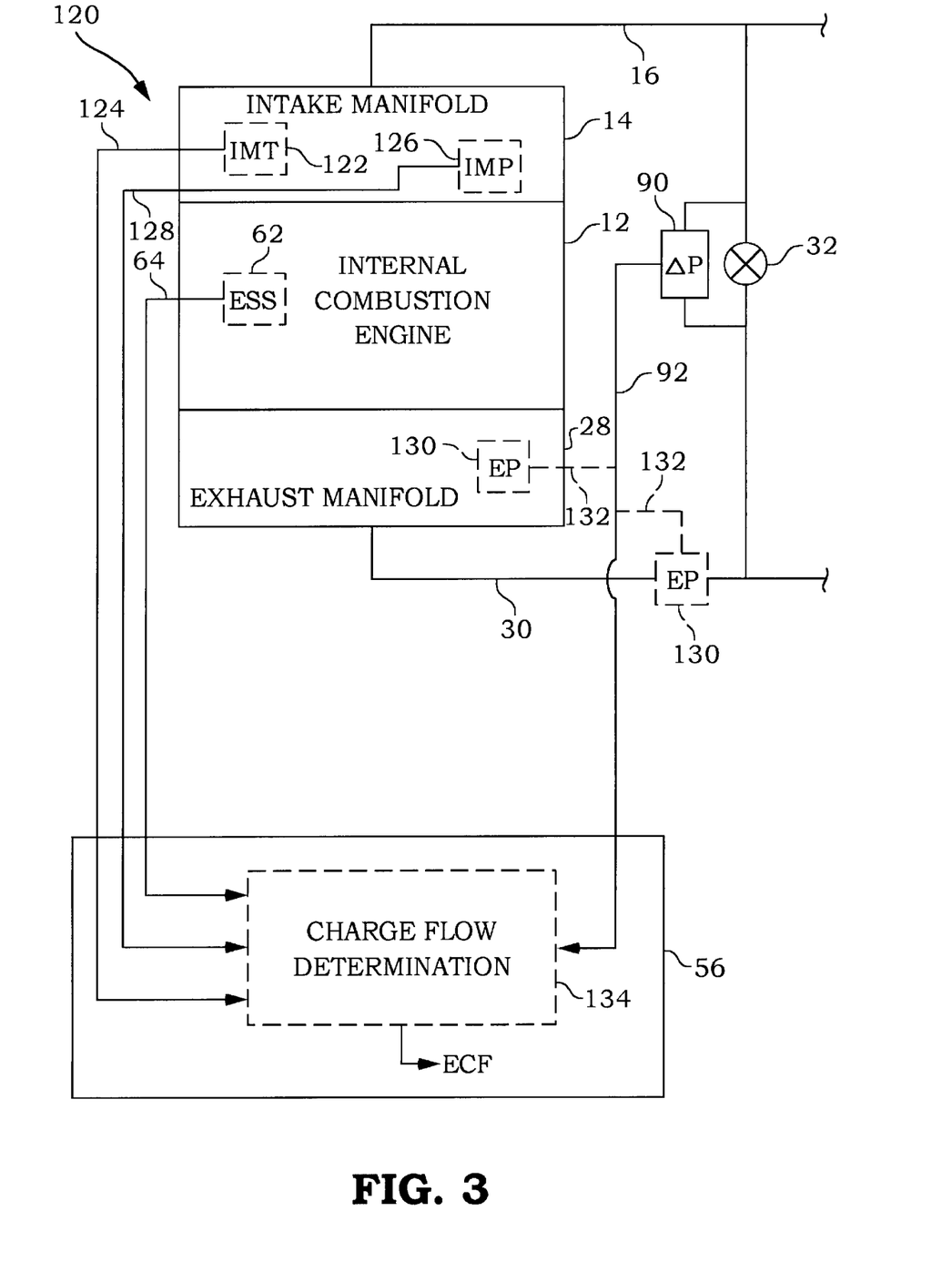
FIG. 3 is a diagrammatic illustration of one preferred embodiment of the charge limit manager block of FIG. 1, in accordance with the present invention.

The charge limit manager 58 further includes an estimated charge flow input ECF preferably receiving an estimated charge flow value ECF from a charge flow virtual sensor or charge flow estimation algorithm resident within engine controller 56. The charge flow estimation algorithm. may be a known algorithm generally, and in one preferred embodiment engine controller 56 includes a charge flow estimation algorithm of the type illustrated in FIG. 3. Referring to FIG. 3, a system 120 is shown for estimating charge flow; i.e., the mass flow of charge supplied to intake manifold 14, wherein the term "charge", as used herein, is defined as a composition of fresh air supplied by conduit 16 and exhaust gas supplied by exhaust conduit 30 via EGR valve 32. In any case, system 120 includes several components in common with system 50 of FIG. 2, and like numbers are therefore used to identify like components. For example, system 120 includes an internal combustion engine 12 having an intake manifold 14 fluidly coupled to a compressor 18 of a turbocharger 25 (not shown) via intake conduit 16, wherein conduit 16 receives fresh air via the turbocharger compressor. An exhaust manifold 28 of engine 12 expels exhaust gas to ambient via exhaust conduit 18, and an EGR valve 32 is disposed in fluid communications with the intake and exhaust conduits 16 and 28 respectively. A ΔP sensor 90 is positioned across the EGR valve 32 and is electrically connected to a charge flow determination block 134 of engine controller 56 via signal path 92, and an engine speed sensor 62 electrically connected to block 134 via signal path 64.

An intake manifold temperature sensor (IMT) 122 is disposed in fluid communication with the intake manifold 14 of engine 12, and is electrically connected to the charge flow determination block 134 of engine controller 56 via signal path 124. IMT sensor 122 is preferably a known sensor operable to produce a signal on signal path 124 corresponding to the temperature of charge flowing into the intake manifold 14. Intake manifold 14 also includes an intake manifold pressure sensor (IMP) 126 in fluid communication therewith and electrically connected to the charge flow determination block 134 of engine controller 56 via signal path 128. Optionally, as will be described in greater detail hereinafter, system 120 may include an exhaust pressure sensor EP 130 disposed in fluid communication with the exhaust manifold 28 or exhaust conduit 30 as shown in phantom in FIG. 3.

In one preferred embodiment, the charge flow determination block 134 of the engine controller 56 is operable to compute an estimate of the mass charge flow (ECF) into intake manifold 14 by first estimating the volumetric efficiency ($\eta_v$) of the charge intake system, and then computing ECF as a function of $\eta_v$ using a conventional speed/density equation. Any known technique for estimating $\eta_v$ may be used, and in one preferred embodiment of block 134 $\eta_v$ is computed according to a known Taylor mach number-based volumetric efficiency equation given as:

$$\eta_v = A_1 * \{(Bore/D)^2 * (stroke * RPM)^B / sqrt(\gamma * R * IMT) * [(1 + EP/IMP) + A_2]\} + A_3,$$

where, $A_1$, $A_2$, $A_3$ and B are all calibratable parameters preferably fit to the volumetric efficiency equation based on mapped engine data, Bore is the intake valve bore length, D is the intake valve diameter, stroke is the piston stroke length, wherein Bore, D and stroke are generally dependent upon engine geometry, $\gamma$ and R are known constants ($\gamma * R = 387.414$ KJ/kg/deg K), RPM is engine speed, IMP is the intake manifold pressure, EP is the exhaust pressure, where EP=IMP+ΔP, and IMT = intake manifold temperature.

From the foregoing equation, it should be apparent that system 120 may substitute an exhaust pressure sensor 130, as shown in phantom in FIG. 3, for the ΔP sensor 90, although commercially available exhaust pressure sensors that are capable of withstanding harsh environments associated with the exhaust manifold 28 and/or exhaust conduit 30 are not typically available. For purposes of the present invention, a ΔP sensor 90 is therefore preferably used.

With the volumetric efficiency value $\eta_v$ estimated according to the foregoing equation, the estimate charge flow value ECF is preferably computed according to the equation:

$$ECF = \eta_v * V_{DIS} * RPM * IMP / (2 * R * IMT),$$

where, $\eta_v$ is the estimated volumetric efficiency, $V_{DIS}$ is engine displacement and is generally dependent upon engine geometry, RPM is engine speed, IMP is the intake manifold pressure, R is a known gas constant (R=54), and IMT is the intake manifold temperature.

Those skilled in the art will recognize that a mass air flow sensor of known construction may alternatively be disposed within the intake manifold 14, wherein information provided by such a mass air flow sensor may be used to determine charge flow directly rather than using a charge flow virtual sensor as just described.

Figure 4:
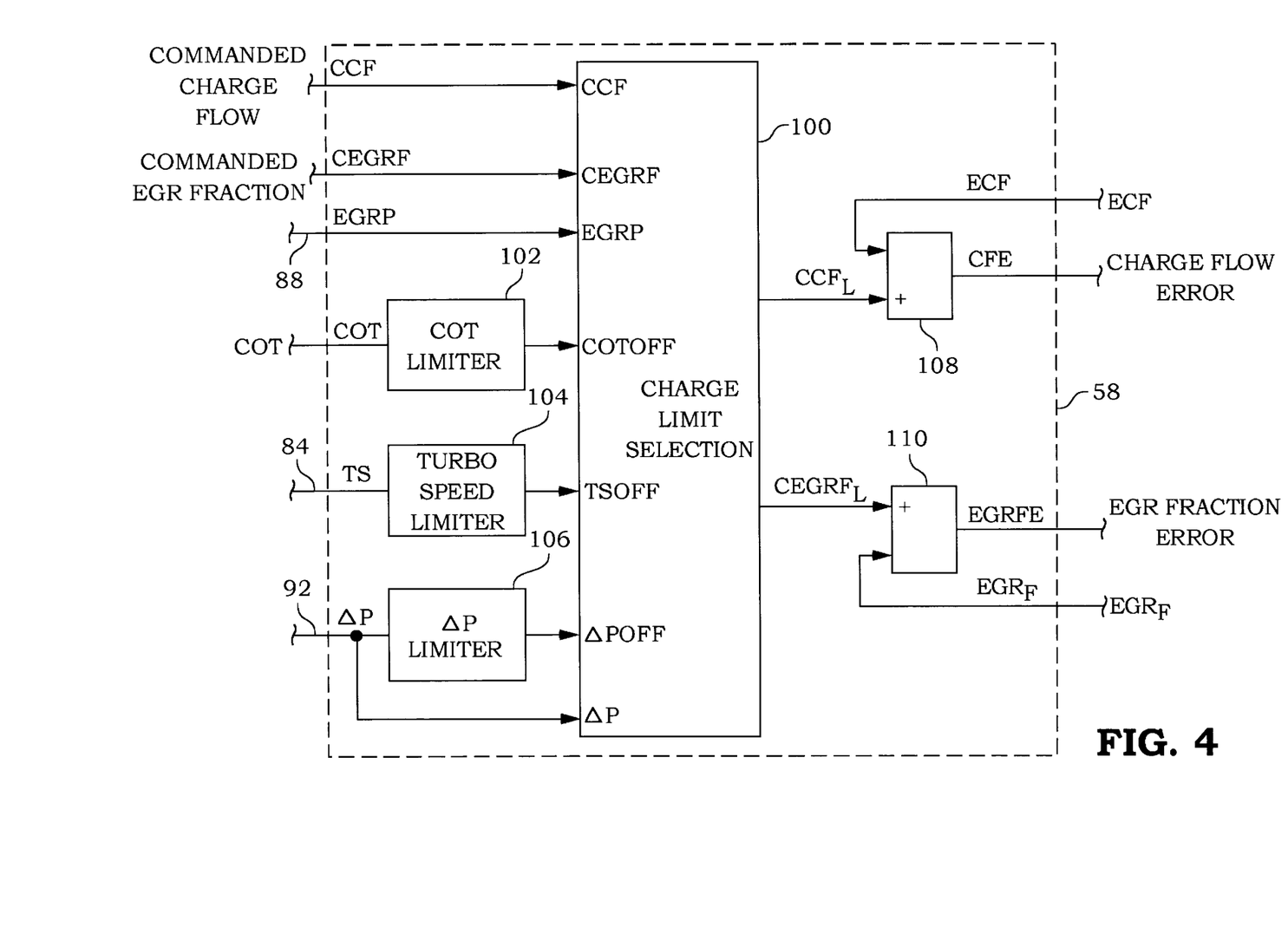
FIG. 4 is a diagrammatic illustration of one preferred embodiment of a technique for determining a charge flow parameter for use with the charge limit manager block of FIGS. 1 and 2.

Referring now to FIG. 4, one preferred embodiment of the charge limit manager block 58 of FIG. 2, in accordance with the present invention, is shown. Block 58 includes a charge limit selection block 100 having a first input CCF receiving the commanded charge flow value CCF, a second input CEGRF receiving the commanded EGR fraction value CEGRF, a third input EGRP receiving the EGR position signal EGRP via signal path 88 and a fourth input receiving the differential pressure signal ΔP via signal path 92. Block 58 further includes a number of operational value limiter blocks providing the charge limit selection block 100 with limiting offset values based on corresponding engine and/or turbocharger operational parameters. For example, block 58 includes a COT limiter block 102 receiving the compressor outlet temperature value COT and providing a corresponding offset value to a compressor outlet temperature offset input COTOFF of the charge limit selection block 100. Block 58 further includes a turbo speed limiter block 104 receiving the turbocharger speed signal TS via signal path 84 and providing a corresponding offset value to a turbocharger speed offset input TSOFF of the charge limit selection block 100. Further still, block 58 includes a ΔP limiter block 106 receiving the differential pressure signal ΔP via signal path 92 and providing a corresponding ΔP offset value to a ΔP offset input ΔPOFF of the charge limit selection block 100. Block 100 is operable to process the foregoing signals in a manner to be described in greater detail hereinafter, and produce a limited charge flow command $CCF_L$ and a limited EGR fraction command $CEGRF_L$. The $CCF_L$ and $CEGRF_L$ values correspond to the commanded charge flow and EGR flow values CCF and CEGRF respectively that have been limited as a function of one or more of the signals/values EGRP, COTOFF, TSOFF, ΔPOFF and/or ΔP. In one embodiment, the limited $CCF_L$ value is supplied to a non-inverting node of a summing block 108 having an inverting input receiving the estimated charge flow signal ECF as described hereinabove. The resulting difference is a charge flow error signal CFE that is supplied to the transform manager block 60 for further processing. Likewise, the limited $CEGRF_L$ value in this embodiment is supplied to a non-inverting input of another summing node 110 having an inverting input receiving the EGR fraction value $EGR_F$. The resulting difference is an EGR fraction error signal EGRFE that is supplied to the transform manager block 60 for further processing. In an alternative embodiment, the limited values $CCF_L$ and $CEGRF_L$ are supplied directly to the transform manager block 60 for further processing. In either case, block 58 is operable, as will be subsequently described in detail, to limit the commanded charge flow and EGR fraction values produced by the combustion manager 55 to corresponding limited values that the one or more EGR/turbocharger actuators connected to signal paths 70, 72 and/or 78 are capable of fully responding to based on the operational states of the various inputs to the charge limit selection block 100.

Figure 5:
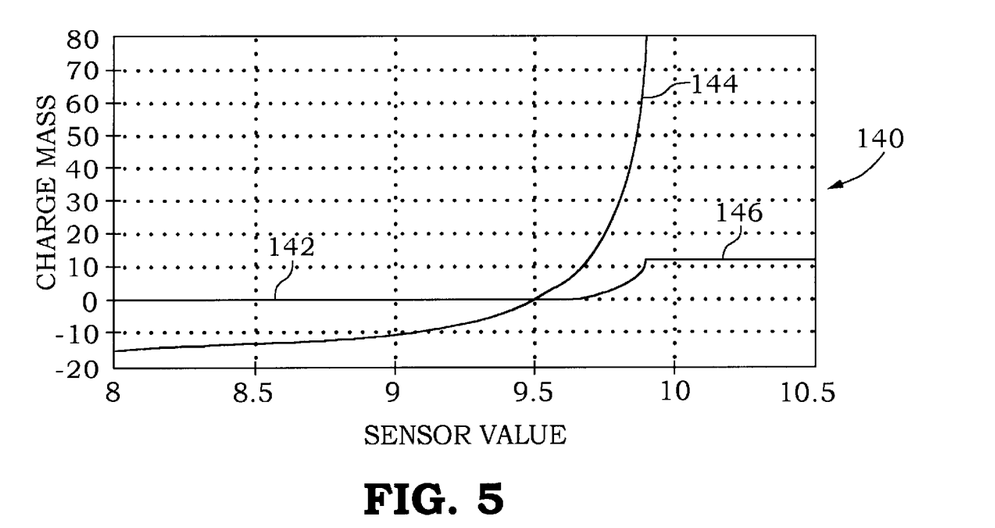
FIG. 5 is a plot of charge mass vs. sensor value illustrating one example of the operation of any of the limiter blocks of the charge limit manager block of FIG. 4, in accordance with the present invention.
Figure 6:
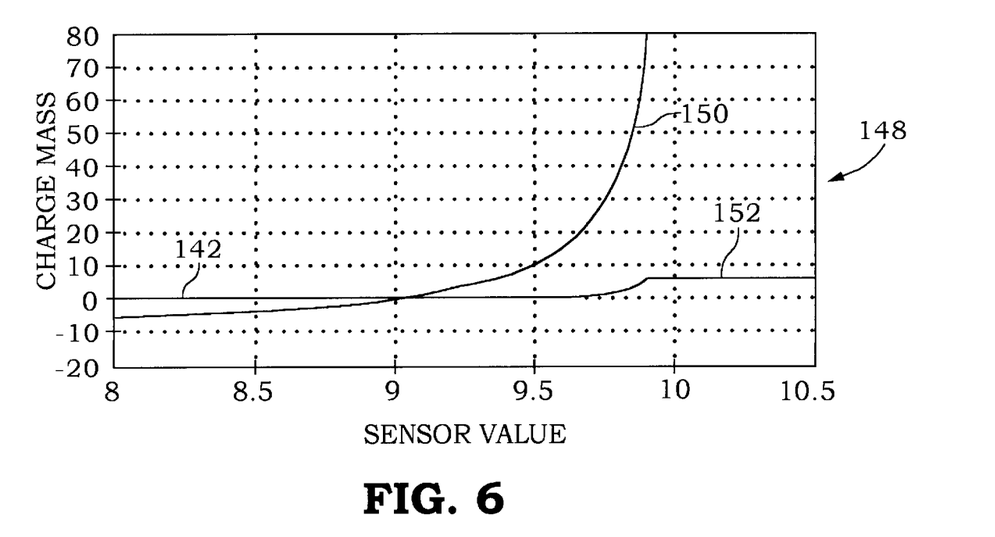
FIG. 6 is a plot of charge mass vs. sensor value illustrating another example of the operation of any of the limiter blocks of the charge limit manager block of FIG. 4, in accordance with the present invention.

Referring now to FIGS. 5 and 6, example plots are shown illustrating operation of any of the limiter blocks 102–106 of FIG. 4. In one preferred embodiment, each of the limiter blocks 102–106 imposes a penalty function based on the difference between the current parameter value and a predefined maximum parameter value, and then computes a derate in units of charge mass, EGR fraction or both, based on this difference. The offset output value for each limiter is the derated parameter value. The net effect of the derate is to increase the opening of the VG actuator and/or the EGR valve 32 and/or to decrease the opening of the exhaust throttle 74.

The penalty function imposed by each of blocks 102–106, in one embodiment, computes a penalty based on a predefined maximum limit and the current value, preferably according to the equation:

$$\text{Penalty} = \text{Max Limit}/(\text{Max Limit} - \text{Current Value}),$$

wherein the Penalty term increases exponentially as the Current Value approaches the Max Limit.

To prevent the Penalty function from computing a derate under all operating conditions, the function is positioned with respect to a desired starting Current Value for application of the derate by adding a Limit Ratio, such that the Penalty function becomes a Penalty Factor defined by the equation:

$$\text{Penalty Factor} = [\text{Max Limit}/(\text{Max Limit} - \text{Current Value})] - 1/(1 - \text{Limit Ratio}).$$

This is illustrated in the charge mass vs. sensor value plot 140 of FIG. 5, wherein the Penalty Factor is represented by line 144, the Penalty Factor crosses zero (line 142) at the Limit ratio (9.5 in FIG. 5), and the Maximum sensor value Limit is $10 \times 10^4$. All negative values of the Penalty Factor are ignored, such that the derate starts where the Penalty Factor crosses the Limit Ratio.

The Penalty Factor must also be scaled into the units of the parameter being derated, e.g., charge mass, EGR fraction or both, by multiplying the Penalty Factor by a gain term. This results in the actual derate value which is represented in the plot 140 of FIG. 5 by line 146. Thus, to tune any of the limiter blocks 102–106 for operation, three parameters must be specified: (1) Max Limit of the parameter (e.g., maximum desired compressor outlet temperature, maximum desired turbocharger speed or maximum desired ΔP value), (2) Limit Ratio—preferably specified as a fraction of the Max Limit that corresponds to the desired start of derate, and (3) Gain—to convert the Penalty Factor into units of the derate parameter.

FIGS. 5 and 6 illustrate two different examples of the turbocharger speed limiter 104 using different Limit Ratio and Gain values, although it should be understood that the plots of FIGS. 5 and 6 are provided only by way of example, and that the COT limiter 102 and the ΔP limiter 106 may be set up to operate in like manner. In any event, the Max Limit in plot 140 of FIG. 5 is set to $10 \times 10^4$, the Limit Ratio is set to 0.95, and the gain is set to 0.14 which converts the maximum derate value to 11.2 units of, in this case, charge mass. Thus, the Penalty Factor line 144 crosses the zero line 142 at 95% of the Max Limit value of $10 \times 10^4$, or $9.5 \times 10^4$, and exponentially increases toward the Max Limit value of $10 \times 10^4$. The derate line 146 has been multiplied by a Gain value of 0.14 and therefore achieves a maximum derate value of 11.2 units of charge mass.

In FIG. 6, the Max Limit is again set to $10 \times 10^4$, the Limit Ratio is set to 0.90, and the gain is set to 0.07 which converts the maximum derate value to 6.3 units of charge mass. Thus, the Penalty Factor line 150 crosses the zero line 142 at 90% of the Max Limit value of $10 \times 10^4$, or $9.0 \times 10^4$, and exponentially increases toward the Max Limit value of $10 \times 10^4$. The derate line 152 has been multiplied by a Gain value of 0.07 and therefore achieves a maximum derate value of 6.3 units of, again in this case, charge mass.

Figure 7:
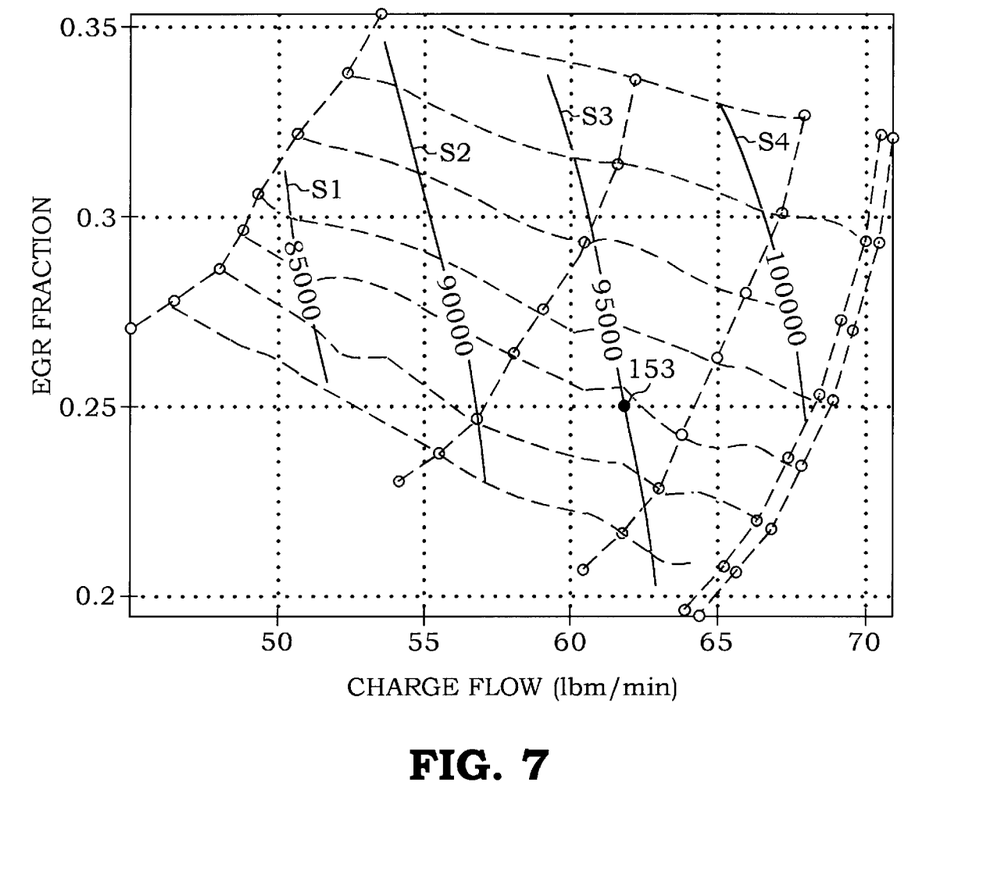
FIG. 7 is a plot of EGR fraction vs. charge flow having lines of constant turbocharger rotor speed superimposed thereon and illustrating operation of the turbo speed limiter block of FIG. 4 in accordance with one preferred embodiment thereof.

It is to be understood that the penalty function just described is provided only by way of example, and that the present invention contemplates providing other penalty functions for one or more of the limiter blocks 102–106. Those skilled in the art will recognize that the penalty functions imposed by any of blocks 102–106 may take on many forms, and that any penalty functions satisfying the general control concepts described herein are intended to fall within the scope of the present invention. For example, the turbocharger speed penalty function embodiments of FIGS. 5 and 6 were described above as having units of charge mass. In this particular embodiment, the penalty function is preferably chosen to be in units of charge mass largely because the charge mass values are substantially constant along any given rotor speed contour as shown in FIG. 7. Referring to FIG. 7, a plot of EGR fraction vs. charge mass is shown having a number of lines of constant turbocharger rotor speed s1–s4 superimposed thereon. The lines s1–s4 of constant rotor speed are substantially vertical so that a choice of charge mass (e.g., point 153) will generally allow for a wide range of possible EGR fraction settings. By imposing a derate in units of charge mass in this case, air handling control of system 50 continues to optimize the EGR/turbocharger hardware using its basic capabilities, and issues related to interaction of competing controllers are thereby avoided.

Figure 8:
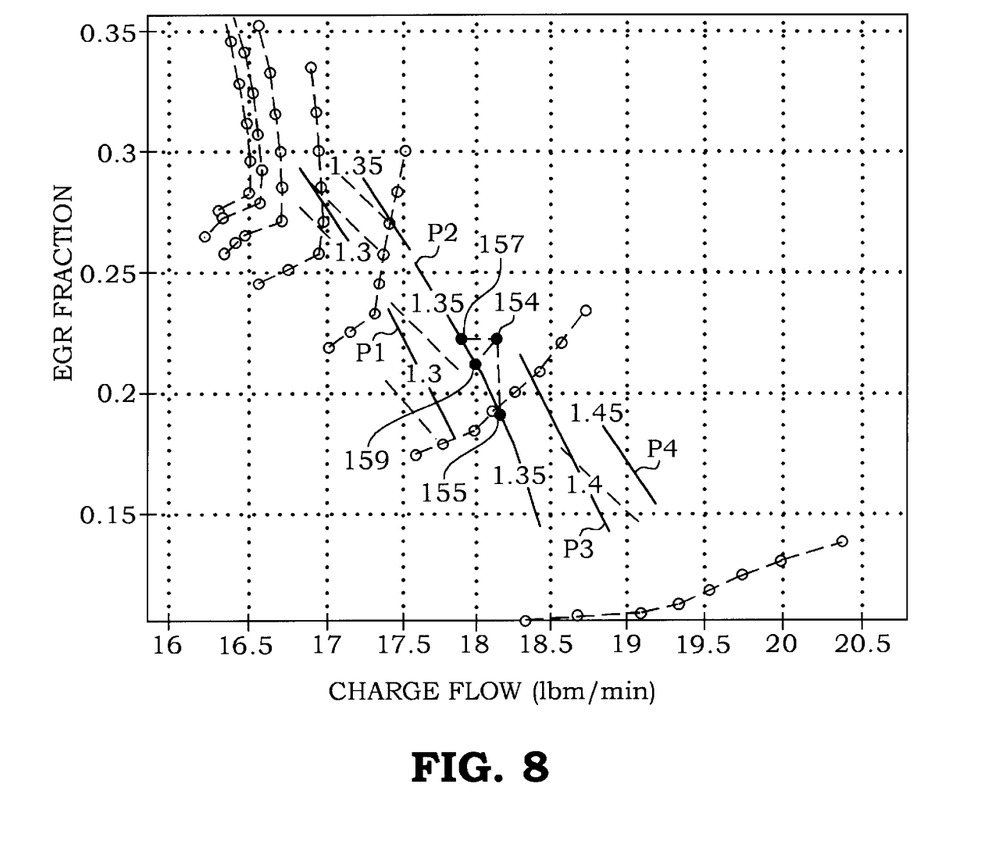
FIG. 8 is a plot of EGR fraction vs. charge flow having lines of constant $\Delta P$ superimposed thereon and illustrating operation of the $\Delta P$ limiter block of FIG. 4 in accordance with one preferred embodiment thereof.

However, while the turbo speed limiter 102 embodiment just described imposes a penalty function in derate in units of charge mass, one or more of the limiter blocks 102–106 may alternatively be configured to impose a derate in units of EGR fraction, or a combination of charge mass and EGR fraction. As a specific example the differential pressure $\Delta P$ in one particular embodiment may exhibit an interdependent relationship with both EGR fraction and charge mass as illustrated in FIG. 8. Referring to FIG. 8, a plot of EGR fraction vs. charge flow is shown having a number of lines p1–p4 of constant $\Delta P$ superimposed thereon, wherein lines p1–p4 are generally curved and are therefore functions of both EGR fraction and charge flow. Thus, if operating point 154 is to be moved to $\Delta P$ line p2, a number of control strategies are possible. For example, if the current charge flow value is to be maintained, the penalty function produced by the $\Delta P$ limiter 106 is provided in units of charge mass to move point 154 along the vertical dashed-line to point 155, thereby dictating a singular EGR fraction value. If, on the other hand, the current EGR fraction value is to be maintained, the penalty function produced by the $\Delta P$ limiter 106 is provided in units of EGR fraction to move point 154 along the horizontal dashed-line to point 157, thereby dictating a singular charge flow value. However, with respect to the two operating extremes 155 and 157, point 155 generally minimizes particulate emissions while point 157 generally minimizes $NO_x$ emissions. It may therefore be desirable to optimize a tradeoff between $NO_x$ and particulate emissions by providing the penalty function produced by the $\Delta P$ limiter in units of both charge flow and EGR fraction to thereby control point 154 along the diagonal dashed-line (e.g., using a MIN function) to point 159. It is to be understood that any of the penalty functions produced by any of the limiter blocks 102–106 of FIG. 4 may be provided in units of charge mass, EGR fraction or both, wherein one or more choices of any such penalty function units will generally be dictated by the relationships between the various limiter input signals and the charge flow and EGR fraction space, which relationships are generally defined by the configuration of the engine 12 and air handling system.

Figure 9:
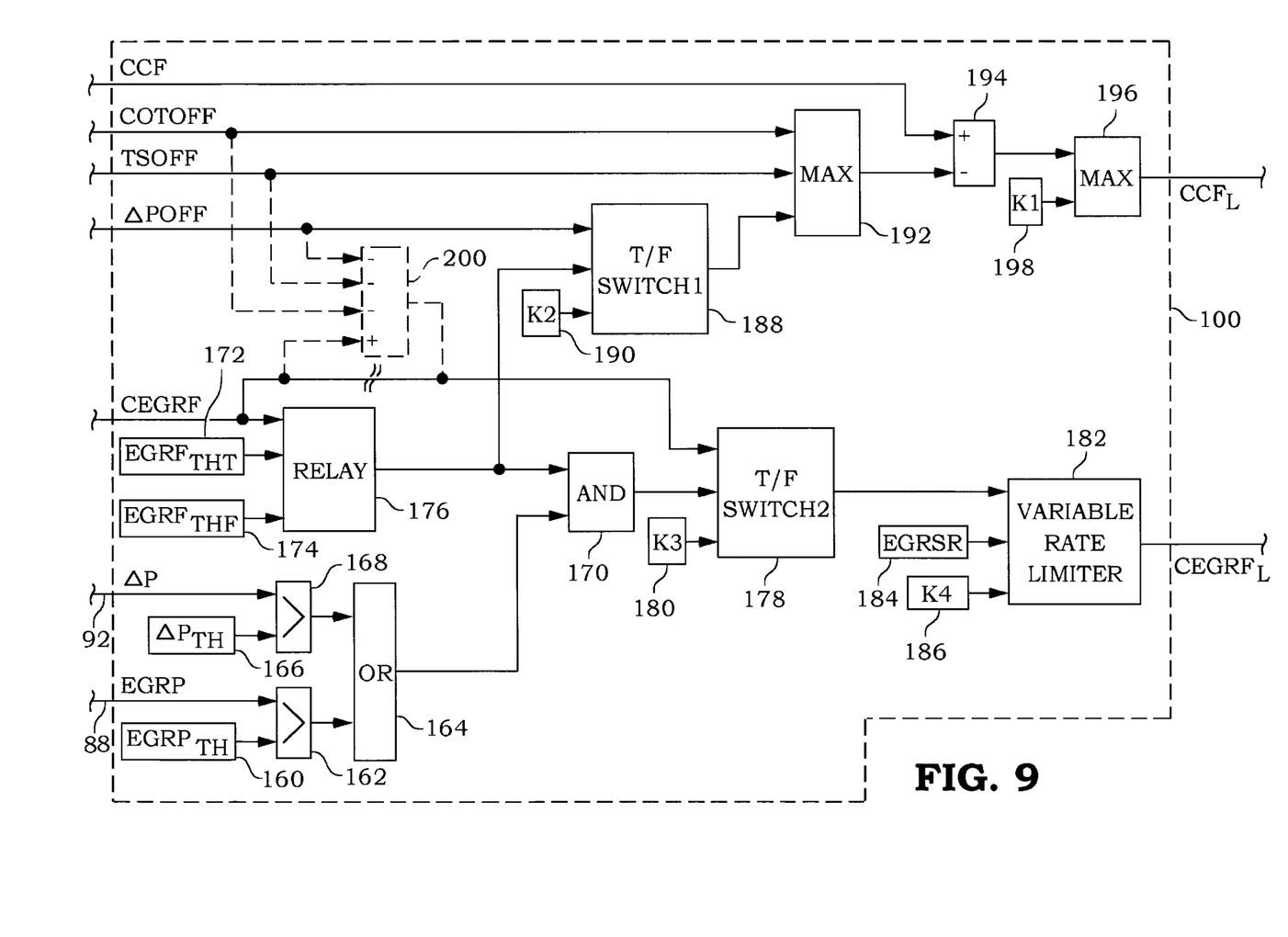
FIG. 9 is a diagrammatic illustration of one preferred embodiment of the charge limit selection block of the charge limit manager block of FIG. 4.

Referring now to FIG. 9, one preferred embodiment of the charge limit selection block 100 of FIG. 4, in accordance with the present invention, is shown. Block 100 includes a constant block 160 producing an EGR position threshold value $EGRP_{TH}$ preferably corresponding to the smallest displacement of the EGR valve 32 that can be detected. This value is fed, along with the EGR position signal EGRP on signal path 88, to a function block that produces a TRUE value if EGRP is greater than $EGRP_{TH}$, and that produces a FALSE value if EGRP is less than or equal to $EGRP_{TH}$. Another constant block 166 produces a $\Delta P$ threshold value $\Delta P_{TH}$ that is preferably a function of the range of the $\Delta P$ sensor 90 and of the mechanical capabilities of the EGR valve 32. This value is fed, along with the $\Delta P$ signal on signal path 92, to a function block 168 that produces a TRUE value if $\Delta P$ is greater than $\Delta P_{TH}$, and that produces a FALSE value if $\Delta P$ is less than or equal to $\Delta P_{TH}$. The outputs of function blocks 162 and 168 are supplied to an OR block having an output leading to one input of an AND block 170. In the operation of blocks 160–168, the output of the OR block is preferably true only if/when the EGR valve 32 is open or if/when $\Delta P$ is below the $\Delta P$ limit for EGR valve opening. The operation of the functional blocks just described therefore prevent the EGR valve 32 from opening under high $\Delta P$ conditions.

Block 100 further includes a relay block 176 receiving the commanded EGR fraction signal CEGRF at a first input thereof. A second input of relay block 176 receives an EGR fraction true threshold value $EGRF_{THT}$ from block 172, and a third of relay block 176 receives an EGR fraction false threshold value $EGRF_{THF}$ from block 174. The output of relay block 176 feeds a second input of AND block 170. Relay block 176 is operable to produce a TRUE signal if the commanded EGR fraction value CEGRF is above the true threshold $EGRF_{THT}$ and produces a FALSE value if the commanded EGR fraction value CEGRF is above the false threshold $EGRF_{THF}$, wherein $EGRF_{THF}$ is preferably less than $EGRF_{THT}$.

The output of the AND block 170 is provided to one input of a true/false switch 178 having a second input receiving the commanded EGR fraction value CEGRF and a third input receiving a constant value K3 (preferably zero) from block 180. True/false switch 178 has an output feeding one input of a variable rate limiter block 182 of known construction and provides the commanded EGR fraction signal CEGRF thereto if the output of the AND block is true (i.e., if the commanded EGR fraction value CEGRF is greater than the EGRF threshold value $EGRF_{THT}$ and either the EGR valve 32 is already open or $\Delta P$ is below the $\Delta P$ threshold $\Delta P_{TH}$ for opening of the EGR valve 32). Otherwise, if the output of the AND block 170 is false, the true/false switch 178 passes the constant K3 (preferably zero) to the input of the variable rate limiter block 182.

The variable rate limiter block 182 includes a second input receiving an EGR slew rate value EGRSR from block 184 and a third input receiving a constant value K4 from block 186. Preferably, the EGR slew rate value is a calibratable for a desired exhaust particulate level, and its value is preferably set through appropriate tuning in an emissions cell. The constant K4 is preferably set to a low enough value such that while the resulting limited EGR fraction command $CEGRF_L$ rises in value according to the slew rate value under EGR valve opening conditions, the commanded EGR fraction command CEGRF is effectively not limited under EGR closing conditions and therefore drops sharply in value.

The output of relay 176 is also fed to another true/false switch 188 having a second input receiving the $\Delta POFF$ value from the $\Delta P$ limiter 106, and a third input receiving a constant (preferably zero) from block 190. If the output of the relay block 176 is true (i.e., if the commanded EGR fraction value CEGRF is greater than the $EGR_F$ threshold value $EGRF_{THT}$), the true/false switch 188 produces a true value at its output. Otherwise, if the output of the relay block 176 is false, the true/false switch 188 produces a false value at its output. Block 88 is preferably included to inhibit the ΔP limiter 106 from affecting the charge flow limiting operation of block 100 unless at least some EGR fraction is being commanded. The output of true/false switch 188 is fed to one input of a MAX block 192 having a second input receiving the turbocharger speed offset value TSOFF from the turbo speed limiter block 104 of FIG. 4, and having a third input receiving the compressor outlet temperature offset value COTOFF from the COT limiter block 102 of FIG. 4. The maximum of the three input signals is supplied by the MAX block 192 to an inverting input of a summation block 194 having a non-inverting input receiving the commanded charge flow value CCF. The difference between CCF and the output of the MAX block 192 is provided to one input of a second MAX block 196 having a second input receiving a constant value K1 from block 198. Preferably K1 is set to zero to avoid a negative charge flow command, and the output of MAX block 196 provides the limited charge flow command $CCF_L$;

It is to be understood that the charge limit selection block 100 illustrated in FIG. 9 is shown for the case where the penalty functions imposed by limiter blocks 102–106 are each provided in units of charge flow only. Block 100 is thus designed such that the various offset values (e.g., COTOFF, TSOFF and ΔPOFF) affect only the limited charge flow command $CCF_L$. Those skilled in the art will recognize that block 100 could alternatively or additionally be configured such that one or more of the various offset values COTOFF, TSOFF and ΔPOFF impacts the limited EGR fraction command $CEGRF_L$, wherein the corresponding penalty functions would be provided in appropriate units. For example, the charge limit selection block 100 may optionally or alternatively include an arithmetic block 200, as shown in phantom in FIG. 9, wherein block 200 includes an addition input receiving the commanded EGR fraction value CEGRF. Block 200 further includes one or more subtraction inputs (three such inputs shown in FIG. 9) for receiving a corresponding one or more of the various offset values (e.g., COTOFF, TSOFF and ΔPOFF), wherein any such offset value includes a penalty function having units of EGR fraction as described hereinabove. It is to be understood that block 100 may be configured such that any of the various offset values (e.g., CTOFF, TSOFF and ΔPOFF) include penalty functions having units of charge flow only, EGR fraction only and/or both charge flow and EGR fraction components, and that any such configuration and/or combination thereof falls within the scope of the present invention.

While the invention has been illustrated and described in detail in the foregoing drawings and description, the same is to be considered as illustrative and not restrictive in character, it being understood that only preferred embodiments thereof have been shown and described and that all changes and modifications that come within the spirit of the invention are desired to be protected.

What is claimed is:

1. A system for managing charge flow and EGR fraction in an internal combustion engine, comprising:
   a valve disposed between an exhaust manifold and an intake manifold of an internal combustion engine;
   means for determining a differential pressure across said valve resulting from flow of exhaust gas from said exhaust manifold to said intake manifold;
   a valve position sensor producing a position signal indicative of a position of said valve relative to a reference valve position; and
   a control circuit limiting a commanded EGR fraction value to a limited EGR fraction value as a function of said differential pressure signal and of said position signal.

2. The system of claim 1 further including means responsive to said limited EGR fraction value and an actual EGR fraction value for producing an EGR fraction error corresponding to a difference therebetween.

3. The system of claim 1 wherein said control circuit includes:
   means for producing a first true value if either of said differential pressure signal is less than a differential pressure threshold value and said position signal is greater than a position signal threshold;
   means for producing a second true value if said commanded EGR fraction value is above an EGR fraction threshold; and
   means responsive to said first and second true values for limiting said commanded EGR fraction value to said limited EGR fraction value, and otherwise limiting said commanded EGR value to a constant EGR fraction value.

4. The system of claim 3 wherein said means responsive to said first and second true values includes a variable rate limiter rate limiting said commanded EGR fraction value in an EGR valve opening direction as a function of a slew rate value.

5. The system of claim 4 wherein said variable rate limiter is configured to inhibit rate limiting of said commanded EGR fraction value in an EGR valve closing direction.

6. The system of claim 4 further including a first limiter responsive to said differential pressure signal to produce a first penalty value;
   and wherein said control circuit is further operable to limit a commanded charge flow value to a limited charge flow value, said control circuit including means for limiting said commanded charge flow value to said limited charge flow value as a function of said first penalty value only in response to said second true value.

7. A system for managing charge flow and EGR fraction in an internal combustion engine, comprising:
   a turbocharger for an internal combustion engine including a compressor supplying fresh air to an intake manifold of said engine;
   means for determining an outlet temperature of said compressor;
   a speed sensor producing a speed signal indicative of a rotational speed of said compressor;
   a first limiter producing a first penalty value as a function of said outlet temperature;
   a second limiter producing a second penalty value as a function of said speed signal; and
   a control circuit limiting a commanded charge flow value to a limited charge flow value as a function of at least one of said first and second penalty values.

8. The system of claim 7 wherein said control circuit includes:
   means for selecting a maximum of said first and second penalty values; and
   means for producing as said limited charge flow value a difference between said commanded charge flow value and said maximum of said first and second penalty values.

9. The system of claim 7 further including means responsive to said limited charge flow value and an actual charge flow value for producing a charge flow error corresponding to a difference therebetween.

10. The system of claim 7 further including:
   a valve disposed between an exhaust manifold and said intake manifold of said engine;
   means for determining a differential pressure across said valve resulting from flow of exhaust gas from said exhaust manifold to said intake manifold; and
   a third limiter producing a third penalty value as a function of said differential pressure;
   and wherein said control circuit is operable to limit said commanded charge flow value to said limited charge flow value as a function of at least one of said first, second and third penalty values.

11. The system of claim 10 wherein said control circuit includes:
   means for selecting a maximum of said first, second and third penalty values; and
   means for producing as said limited charge flow value a difference between said commanded charge flow value and said maximum of said first, second and third penalty values.

12. The system of claim 10 further including means for producing a true signal in response to a commanded EGR fraction command exceeding an EGR fraction threshold value;
   and wherein said control circuit includes means responsive to said true signal for limiting said commanded charge flow value to said limited charge flow value as a function of said third penalty value, and otherwise inhibiting said third penalty value.

13. The system of claim 10 further including a valve position sensor producing a position signal indicative of a position of said valve relative to a reference valve position; and
   wherein said control circuit includes means for limiting a commanded EGR fraction value to a limited EGR fraction value as a function of said differential pressure signal and of said position signal.

14. A system for managing charge flow and EGR fraction in an internal combustion engine, comprising:
   a turbocharger for an internal combustion engine including a compressor supplying fresh air to an intake manifold of said engine;
   means for determining an outlet temperature of said compressor;
   a limiter producing a penalty value as a function of said outlet temperature; and
   a control circuit limiting a commanded charge flow value to a limited charge value as a function of said penalty value.

15. The system of claim 14 wherein said control circuit includes means for producing said limited charge flow value as a difference between said commanded charge flow value and said penalty value.

16. The system of claim 14 further including:
   a valve disposed between an exhaust manifold and said intake manifold of said engine;
   means for determining a differential pressure across said valve resulting from flow of exhaust gas from said exhaust manifold to said intake manifold; and
   a valve position sensor producing a position signal indicative of a position of said valve relative to a reference valve position;
   and wherein said control circuit includes means for limiting said commanded EGR fraction value to a limited EGR fraction value as a function of said differential pressure signal and of said position signal.

17. The system of claim 14 further including means responsive to said limited charge flow value and an actual charge flow value for producing a charge flow error value corresponding to a difference therebetween.

18. A system for managing charge flow and EGR fraction in an internal combustion engine, comprising:
   a turbocharger for an internal combustion engine including a compressor supplying fresh air to an intake manifold of said engine;
   a speed sensor producing a speed signal indicative of a rotational speed of said compressor;
   a limiter producing a penalty value as a function of said speed signal; and
   a control circuit limiting a commanded charge flow value to a limited charge flow value as a function of said penalty value.

19. The system of claim 18 wherein said control circuit includes means for producing said limited charge flow value as a difference between said commanded charge flow value and said penalty value.

20. The system of claim 18 further including:
   a valve disposed between an exhaust manifold and said intake manifold of said engine;
   means for determining a differential pressure across said valve resulting from flow of exhaust gas from said exhaust manifold to said intake manifold; and
   a valve position sensor producing a position signal indicative of a position of said valve relative to a reference valve position;
   and wherein said control circuit includes means for limiting a commanded EGR fraction value to a limited EGR fraction value as a function of said differential pressure signal and of said position signal.

21. The system of claim 18 further including means responsive to said limited charge flow value and an actual charge flow value for producing a charge flow error value corresponding to a difference therebetween.

22. A system for managing charge flow and EGR fraction in an internal combustion engine, comprising:
   a valve disposed between an exhaust manifold and an intake manifold of an internal combustion engine;
   means for determining a differential pressure across said valve resulting from flow of exhaust gas from said exhaust manifold to said intake manifold;
   a limiter producing a penalty value as a function of said differential pressure; and
   a control circuit limiting a commanded charge flow value to a corresponding limited charge flow value as a function of said penalty value.

23. The system of claim 22 wherein said control circuit includes means for producing said limited charge flow value as a difference between said commanded charge flow value and said penalty value.

24. The system of claim 22 further including a valve position sensor producing a position signal indicative of a position of said valve relative to a reference valve position;
   and wherein said control circuit includes means for limiting a commanded EGR fraction value to a limited EGR fraction value as a function of said differential pressure signal and of said position signal.

25. The system of claim 22 further including means responsive to said limited charge flow value and an actual charge flow value for producing a charge flow error corresponding to a difference therebetween.

* * * * *